(12) United States Patent
Inoue et al.

(10) Patent No.: US 6,362,936 B2
(45) Date of Patent: *Mar. 26, 2002

(54) SUSPENSION ASSEMBLY WITH INTEGRAL PROJECTIONS HAVING A COATING OF ELASTIC MATERIAL

(75) Inventors: Hiroo Inoue; Keishi Takahashi, both of Fujisawa; Hiroshi Matsuda, Zama; Fujio Harako, Fujisawa, all of (JP)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/254,572

(22) PCT Filed: Sep. 25, 1997

(86) PCT No.: PCT/JP97/03425

§ 371 Date: Mar. 4, 1999

§ 102(e) Date: Mar. 4, 1999

(87) PCT Pub. No.: WO98/13827

PCT Pub. Date: Apr. 2, 1998

(30) Foreign Application Priority Data

Sep. 26, 1996 (JP) ............................................... 8-254923

(51) Int. Cl.⁷ .............................. G11B 21/16; G11B 5/48
(52) U.S. Cl. .................................. 360/244.2; 360/244.8
(58) Field of Search ............................ 360/245, 245.3, 360/244.2, 244.8

(56) References Cited

U.S. PATENT DOCUMENTS

| | | | | |
|---|---|---|---|---|
| 5,422,770 A | * | 6/1995 | Alt | 360/244.2 |
| 5,572,387 A | * | 11/1996 | Brooks, Jr. et al. | 360/104 |
| 5,682,279 A | * | 10/1997 | Imasaki | 360/104 |
| 5,790,347 A | * | 8/1998 | Girard | 360/104 |
| 5,831,793 A | * | 11/1998 | Resh | 360/244.8 |
| 6,072,664 A | * | 6/2000 | Aoyagi et al. | 360/244.2 |
| 6,201,664 B1 | * | 3/2001 | Le et al. | 360/244.9 |
| 6,222,704 B1 | * | 4/2001 | Aoyagi et al. | 360/244.9 |

FOREIGN PATENT DOCUMENTS

| | | |
|---|---|---|
| EP | 0-324 966 | 7/1989 |
| EP | 0-658 882 | 6/1995 |
| EP | 0-700 034 | 3/1996 |
| JP | 61-177691 | 8/1986 |
| JP | 02-232876 | 9/1990 |
| JP | 4-139672 | * 5/1992 |

* cited by examiner

*Primary Examiner*—William Klimowicz
*Assistant Examiner*—Julie Anne Watko
(74) *Attorney, Agent, or Firm*—Douglas R. Millett

(57) ABSTRACT

A head support assembly for a disk drive is comprised of a head suspension assembly connected to an actuator arm at one end and supporting a head at the other end, wherein a projection is formed on a flexure closely fixed on a thin-plate load beam, said projection projecting toward a disk surface and having a smooth surface. The projection is formed at a region somewhat close to the head supporting end from the hinge portion of the load beam. When shock is applied to the disk drive, bending occurs around the hinge portion of the load beam. During such bending, the projection having a smooth round surface is caused to contact the disk, whereby the disk surface is prevented from being damaged.

3 Claims, 5 Drawing Sheets

Prior Art

Prior Art

Prior Art

SUSPENSION ASSEMBLY WITH INTEGRAL PROJECTIONS HAVING A COATING OF ELASTIC MATERIAL

BACKGROUND OF THE INVENTION

1. Field of the Invention

The present invention relates to a disk storage device, and, more particularly, to a structure of a suspension assembly on one end of which a magnetic head is mounted.

2. Description of the Prior Art

Recent magnetic disk drives are being reduced in size, more particularly, in thickness, and various measures are being taken to accommodate such circumstances. They include, for example, reducing the size of the structure of a load beam. The load beam is a support structure for the magnetic head, for mounting it on an actuator, and the mounting structure for the magnetic head. A typical structure for supporting the magnetic head comprises, as shown in FIG. 1, a mount plate 10 connected to an actuator arm, a load beam 12 coupled to the mount plate 10, and a flexure 14 coupled to the load beam 12, wherein the magnetic head is supported on the flexure 14 with a gimbal structure. A signal line 16 from the head is fixed on the side of the load beam 12.

FIG. 2 shows an exploded view of the mount plate 10, the load beam 12, and the flexure 14. Each component is worked into the predetermined shape, and then coupled and fixed to each other. The load beam 12 or the flexure 14 is manufactured under precise control on its material and thickness so as to provide predetermined mechanical characteristics such as natural frequency and stiffness. The load beam and the flexure are typically made of stainless steel. The mount plate 10 is coupled to the load beam 12 with welding at a plurality of welding points 18 shown in FIG. 1. The load beam 12 and the flexure 14 are also coupled by welding at a plurality of welding points 19.

As the disk drive is made smaller and smaller, the clearance between disks is narrowed down. Accordingly, there is an increased possibility that a head assembly disposed between the disks will collide with the surface of a disk due to some external impact or vibration. If the load beam or the flexure on the head mount contacts a disk surface, the disk surface may be damaged, leading to damage or loss of data. It is believed that, since the load beam or flexure is generally made of stainless steel as described above, and a sharp edge is formed on such stainless steel member, when the edge hits the disk surface, the disk surface tends to be easily scratched.

FIGS. 3 and 4 schematically show a variation of the load beam. The load beam is in the form of a thin plate, and is deformed as shown in FIG. 3 or 4 under an external impact. Consequently, the edge of the load beam (31 in FIG. 3, and 41 in FIG. 4) collides with the disk surface, so that the disk surface may be damaged, leading to damage or loss of data.

The present invention is intended to provide a head support structure which can prevent damage on the disk surface which may be caused by contact between the disk surface and the head assembly.

Furthermore, the present invention is intended to provide a disk drive with excellent impact resistance without impairing its low profile.

SUMMARY OF THE INVENTION

To attain the above objects, a head support assembly for a disk drive according to the present invention comprises a head suspension assembly connected to an actuator arm at one end and supporting a head at the other end, wherein a projection is formed on a flexure closely fixed on a thin-plate load beam, said projection projecting toward a disk surface and having a smooth surface.

According to one aspect of the present invention, the projection is formed at the vicinity of a hinge portion of the load beam, but at a position offset therefrom.

For a fuller understanding of the nature and advantages of the present invention, reference should be made to the following detailed description taken in conjunction with the accompanying drawings.

DESCRIPTION OF THE PREFERRED EMBODIMENTS

The suspension assembly according to the present invention is usually used for a storage disk drive known as a hard disk drive. The storage disk drive comprises a storage disk, a motor for rotating the storage disk, and a head stack assembly or actuator for reading or writing information from or to the storage disk. The head stack assembly comprises a head suspension assembly, and a carriage for supporting the head suspension assembly. The head suspension assembly comprises a head having a transducer, a suspension having a thin-plate load beam, and a flexure fixed on the load beam.

Figure 5:
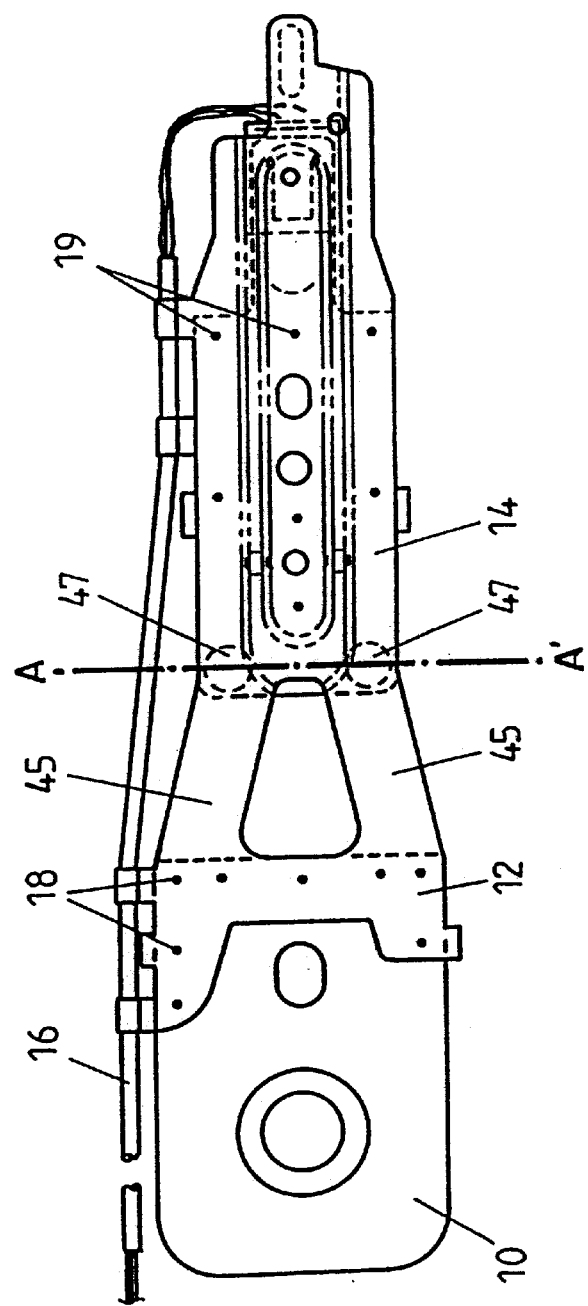
FIG. 5 is a schematic view showing the arrangement of a head suspension assembly according to the present invention.
Figure 7:
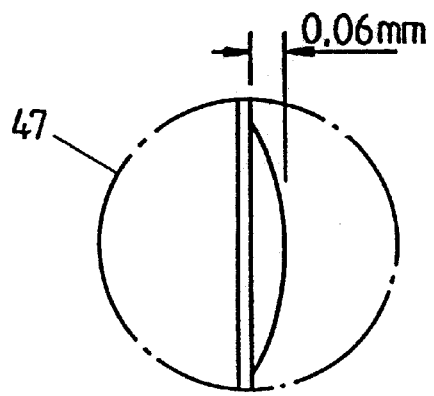
FIG. 7 is an enlarged sectional view of the load beam at a region where the projection is formed.

FIGS. 5 and 7 show an embodiment of the present invention. Referring to FIG. 5, there is shown a plan view of the head suspension assembly according to the present invention. It consists of a mount plate 10 to be coupled to the actuator arm, a load beam 12 coupled to the mount plate 10, and a flexure 14 coupled to the load beam 12. The magnetic head is supported on the flexure 14 with a gimbal support structure. A signal line 16 from the head is fixed on the side of the load beam 12. The mount plate 10 is coupled to the load beam 12 with welding at a plurality of welding points 18. The load beam 12 and the flexure 14 are also coupled by welding at a plurality of welding points 19.

The following is materials and thickness of respective components of the head suspension assembly according to the present invention.

Mount plate 10: Stainless steel (SUS 304), 0.25 mm thick

Load beam 12: Stainless steel (SUS 304), 0.062 mm thick

Flexure 14: Stainless steel (SUS 304), 0.030 mm thick

Figure 3:
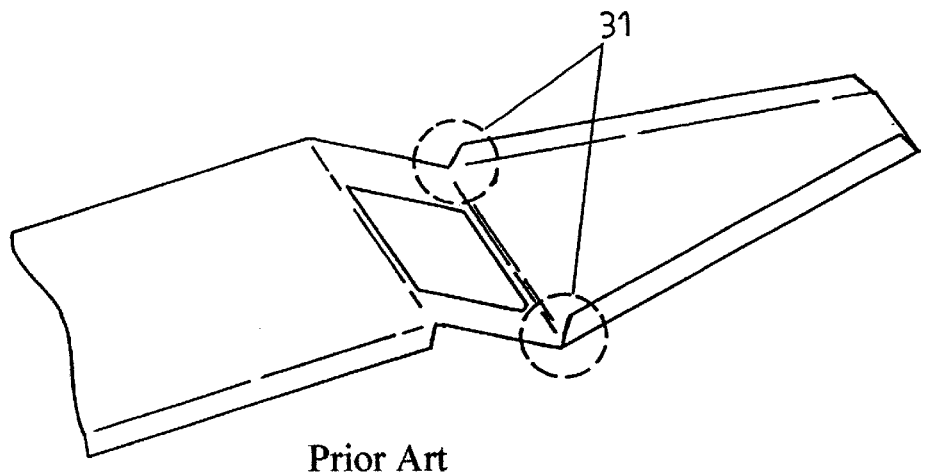
FIG. 3 is a view showing deformation of the typical load beam.
Figure 4:
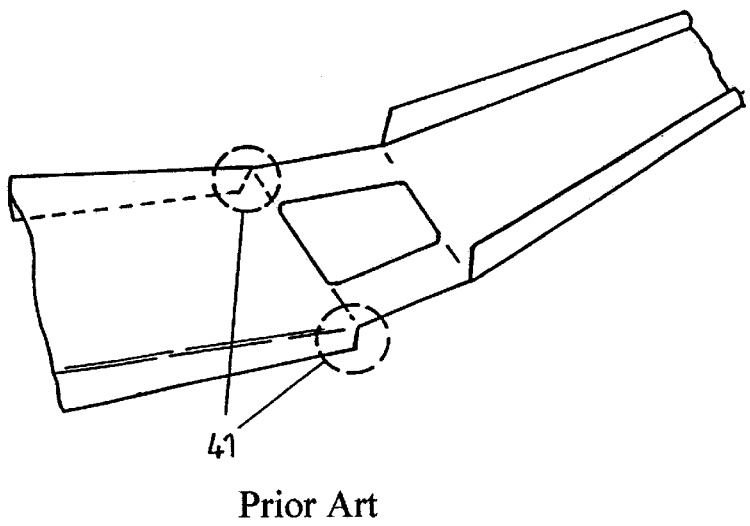
FIG. 4 is a view showing deformation of the typical head suspension assembly.
Figure 6:
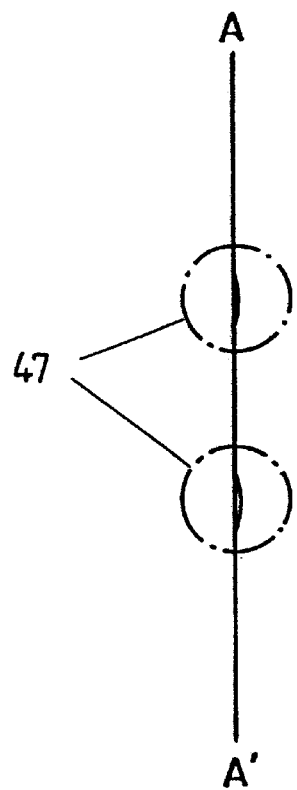
FIG. 6 is a sectional view of the load beam of the present invention at a region where projections are formed.

FIG. 6 is a sectional view taken along line A–A' in FIG. 5. It is an enlarged sectional view of the projection formed on the load beam. Referring to FIG. 5, the load beam 12 is coupled to the mount plate 10 at one end, and supports the head at the other end. The hinge portion 45 is located substantially at the center of these ends. When shock is exerted on the disk drive, bending as described with reference to FIG. 3 or 4 occurs at the hinge portion 45 as the bending point.

The flexure of the present invention is formed with two projections 47 at regions somewhat close to the head supporting end from the hinge portion 45. FIG. 6 shows section A–A' where the projections are formed. As shown in FIG. 6, the projection 47 has a smooth round surface. By making a portion of the load beam to contact the disk surface when the load beam is deformed by external shock the region where this projection is formed, the edge of the load beam can be prevented from colliding with the disk surface.

FIG. 6 shows an enlarged sectional view of the projection 47. In this embodiment, the projection 47 is formed to have a radius 1.35 mm, and a height 0.06 mm from the load beam. Such shape and size of the projection is determined by taking into account the spacing between disks, stiffness of the load beam, and the location where the projection is formed. The projections 47 may be formed by plasticly deforming the flexure 45 with a stamping tool.

The projections 47 formed on the flexure 14 is arranged to become the region contacting the disk due to deformation of the load beam when the disk drive is subjected to external shock or the like. Since the projection 47 has a gradual round surface, it does not scratch the disk surface even if it contacts the disk surface. In addition, contacting of the projection can prevent the edge of the load beam from contacting the disk surface.

While damage on the disk surface can be avoided because the projection has a round surface, an alternative embodiment forms a coating consisting of elastic material such as resin or plastics on the surface of the projection in order to reduce shock on the disk.

Figure 1:
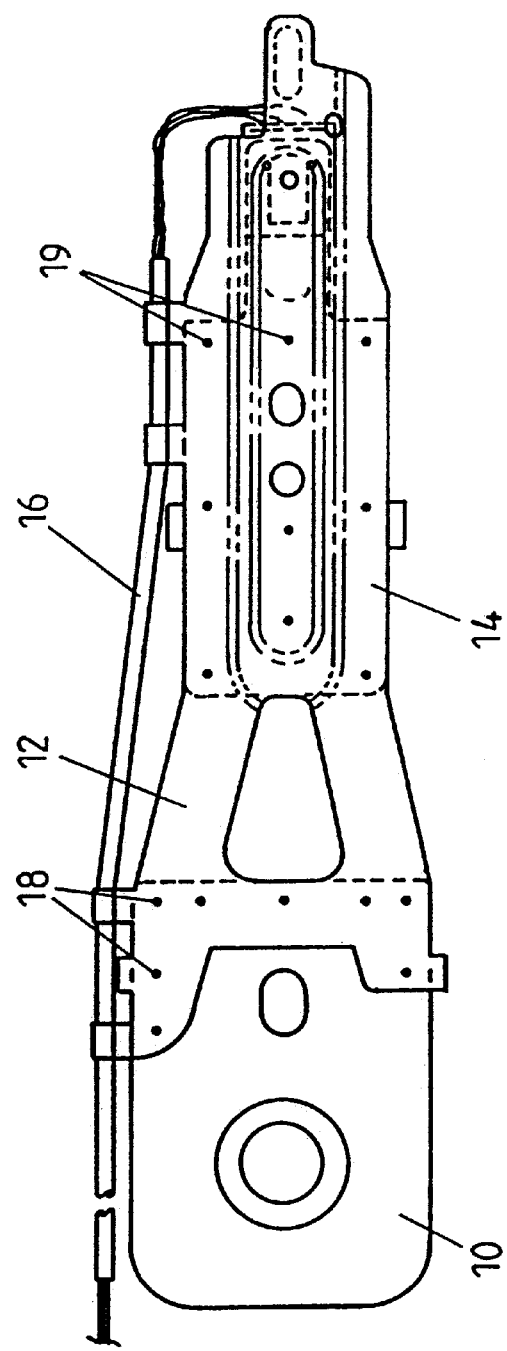
FIG. 1 is a schematic view showing the arrangement of a typical head suspension assembly.
Figure 2:
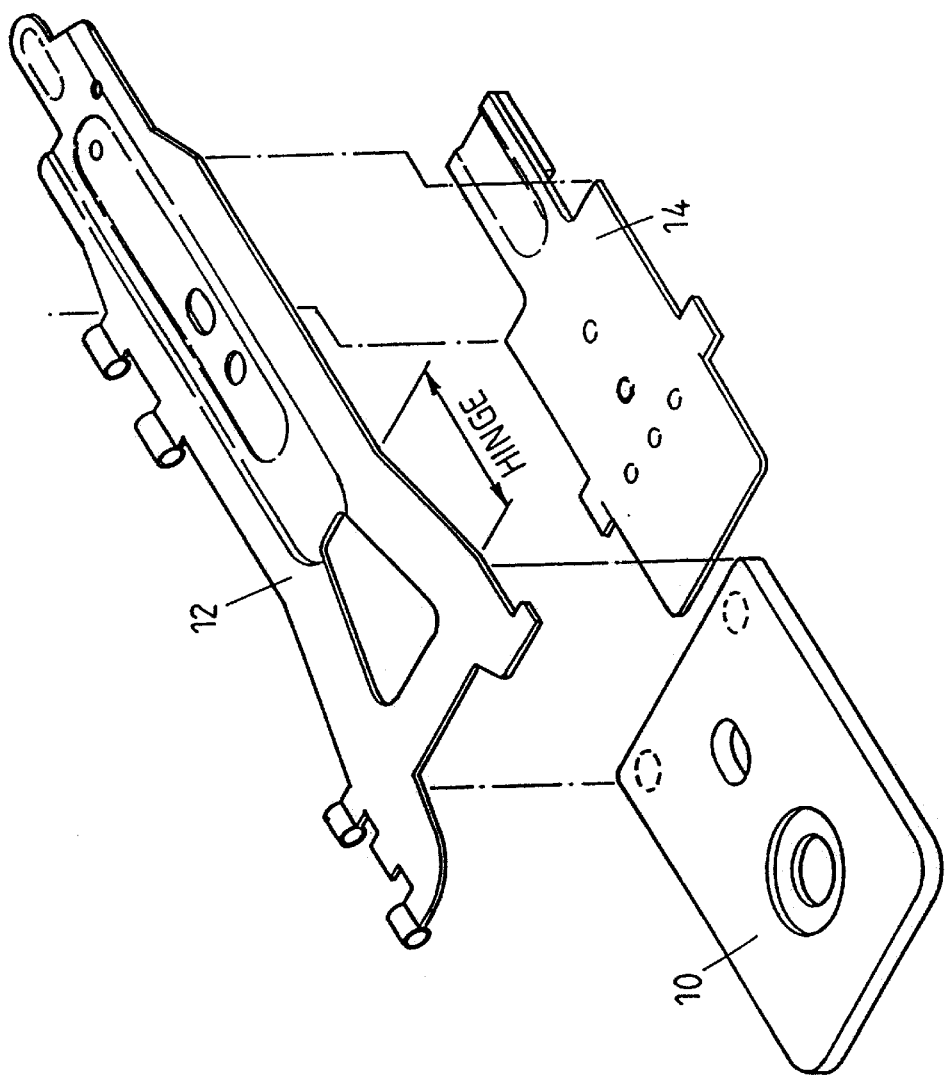
FIG. 2 is an exploded view of the typical head suspension assembly.

In addition, as can be seen from the comparison between FIG. 5 showing the embodiment of the present invention and FIG. 1 showing a prior art, in the embodiment of the present invention provided with the projection 47, a welding point for the load beam 12 and the flexure 14 is not formed on the region where the projection 47 is formed. Accordingly, the flexure 14 is in a free state from the load beam 12 to the region where the projection 47 is provided. With such free arrangement, the projection 47 is designed to be more easily close to the disk surface than the edge of the load beam when the load beam is deformed, whereby the edge is prevented from collision.

In the head suspension assembly according to the present invention, even if the load beam collides with the disk surface when it is deformed by external shock, the projection with smooth round surface formed on the flexure contacts the disk surface, whereby it can prevent the edge of the load beam from colliding with the disk, and effectively prevent data recorded on the disk surface from being lost.

While the preferred embodiments of the present invention have been illustrated in detail it should be apparent that modifications and adaptations to those embodiments may occur to one skilled in the art without departing from the scope of the present invention as set forth in the following claims.

We claim:

1. A suspension system comprising:

a load beam having longitudinal, lateral and vertical axes, the load beam having rear, hinge, and forward sections, all being located substantially along a line parallel to the longitudinal axis, the rear section for attachment to a support member, and the hinge section located between the rear and forward sections, the hinge section having a central aperture surrounded by two legs; and a flexure member attached to the forward section of the load beam, the flexure member extending to an edge of the hinge section, the flexure having a flexible section having a head receiving section for receiving a transducer head on a first side of the head receiving section, the flexure member having at least two rounded projections located along a line substantially parallel to the lateral axis and located proximate to the hinge section, such that the rounded projections are located closer to the hinge section than to the head receiving section, the rounded projections projecting substantially along a line parallel to the vertical axis, the projections extending from the same side of the flexure as the first side of the head receiving section, wherein the projection is an integral plastic deformation of the flexure, the projections having a coating of elastic material.

2. The system of claim 1, wherein the radius of the projections is greater than the vertical distance which the projections extend from the surrounding flexure surface.

3. The system of claim 1, further including said transducer head attached to the head receiving section of the flexure.

* * * * *